(12) United States Patent  (10) Patent No.: US 8,738,233 B2
Inayoshi et al.  (45) Date of Patent: May 27, 2014

(54) APPARATUS AND METHOD FOR DETERMINING SEAT OCCUPANCY

(75) Inventors: Muneto Inayoshi, Nagoya (JP); Akira Enomoto, Kariya (JP); Hiroyuki Fujii, Kariya (JP)

(73) Assignee: Aisin Seiki Kabushiki Kaisha, Kariya-Shi, Aichi-Ken (JP)

( * ) Notice: Subject to any disclaimer, the term of this patent is extended or adjusted under 35 U.S.C. 154(b) by 772 days.

(21) Appl. No.: 12/890,984

(22) Filed: Sep. 27, 2010

(65) Prior Publication Data

US 2011/0098891 A1   Apr. 28, 2011

(30) Foreign Application Priority Data

Oct. 22, 2009   (JP) ................................. 2009-243701

(51) Int. Cl.
*G06F 17/00*   (2006.01)

(52) U.S. Cl.
USPC .......................................................... 701/45

(58) Field of Classification Search
USPC .......................................................... 701/45
See application file for complete search history.

(56) References Cited

U.S. PATENT DOCUMENTS

| 7,266,471 B2* | 9/2007 | Jitsui et al. ..................... 702/155 |
| 2004/0011570 A1* | 1/2004 | Sakamoto et al. ............ 177/144 |

FOREIGN PATENT DOCUMENTS

JP   2009-036564 A   2/2009

\* cited by examiner

*Primary Examiner* — Tarcza H. Thomas
*Assistant Examiner* — Maceeh Anwari
(74) *Attorney, Agent, or Firm* — Buchanan Ingersoll & Rooney PC

(57) ABSTRACT

An apparatus for determining seat occupancy includes a seat for a vehicle, which has a seating portion, right and left load detecting portions arranged between a vehicle floor and either one of a front portion and a rear portion of the seating portion, the right load detecting portion detecting a load applied to a right side of the seating portion, the left load detecting portion detecting a load applied to a left side of the seating portion, and a seat occupancy determining portion calculating a seating load of the seat on the basis of the detected loads and determining the seat occupancy of the seat by comparing the seating load with a predetermined threshold value, wherein the seat occupancy determining portion varies the predetermined threshold value depending on of a difference value between the loads applied to the right and left sides, respectively, of the seating portion.

20 Claims, 10 Drawing Sheets

APPARATUS AND METHOD FOR DETERMINING SEAT OCCUPANCY

CROSS REFERENCE TO RELATED APPLICATIONS

This application is based on and claims priority under 35 U.S.C. §119 to Japanese Patent Application 2009-243701, filed on Oct. 22, 2009, the entire content of which is incorporated herein by reference.

TECHNICAL FIELD

This disclosure relates to an apparatus and a method for determining seat occupancy of a seat for a vehicle.

BACKGROUND DISCUSSION

A recent vehicle seat generally includes a lifting function for adjusting a height of a seat cushion of the seat from a vehicle floor in response to a physique of an occupant seated on the seat (i.e., a seat occupant). The vehicle seat having such lifting function may be equipped with a seat occupancy determining apparatus that detects a load applied to the seat cushion by the occupant and the like so as to determine a seat occupancy state of the seat on the basis of the detected load. Such seat occupancy determining apparatus is disclosed in JP2009-36564A (hereinafter referred to as Reference 1).

According to the seat occupancy determining apparatus disclosed in Reference 1, load sensors are provided respectively at front left, front right, rear left, and rear right portions of a pair of upper rails supporting the seat cushion. A total of loads detected by the respective load sensors is compared with a predetermined threshold value for determining the seat occupancy state. The seat occupancy state detected by the seat occupancy determining apparatus is used for controlling an air-bag operation. For example, in a case where it is determined that an adult is seated on the seat, the air-bag is controlled so as to be fully deployable. In a case where it is determined that no occupant or a child in a child seat is seated on the seat, the air-bag is controlled so as not to be deployable.

According to the aforementioned vehicle seat having the lifting function, a center of gravity of the seat including the seat occupant may vary depending on the height of the seat cushion that is adjusted by the lifting function.

FIG. 13A is a simplified view illustrating a state where a seat cushion 71 of a vehicle seat 70 having the lifting function is arranged at the lowest position. FIG. 13B is a simplified view illustrating a state where the seat cushion 71 of the vehicle seat 70 is moved upward by means of the lifting function so as to be positioned in a highest position. As illustrated in FIG. 13A, when the seat cushion 71 is positioned in a lowest position, a center of gravity G of the vehicle seat 70 including a seat occupant PS is defined to be positioned at a height t from a vehicle floor FL. At this time, the seat cushion 71 tends to be inclined in such a way that a rear portion of the seat cushion 71 is positioned lower than a front portion thereof by an angle $\alpha$ (i.e., a seat surface angle) relative to a horizontal direction.

On the other hand, as illustrated in FIG. 13B, when the seat cushion 71 is in the highest position, the center of gravity G of the vehicle seat 70 is positioned at a height T from the vehicle floor FL, which is higher than the height t of the center of gravity G of the vehicle seat 70 in the lowest position. At this time, the seat cushion 71 tends to be inclined in such a way that the front portion of the seat cushion 71 is positioned lower than the rear portion thereof by an angle $\beta$ relative to the horizontal direction (i.e., when the horizontal direction is defined to be zero degree, a relationship $\beta < o\beta\alpha$ is obtained).

As seen from a comparison between FIGS. 13A and 13B, in association with the upward movement of the seat cushion 71 from the lowest position to the highest position thereof, the center of gravity G of the vehicle seat 70 including the seat occupant PS moves toward a forward direction from a rearward direction of the vehicle seat 70. In addition, the inclination of the seat cushion 71 changes from a state where the rear portion of the seat cushion 71 is lower than the front portion thereof to a state where the front portion of the seat cushion 71 is lower than the rear portion thereof. That is, in the vehicle seat 70 having the lifting function, a seating load applied in a direction towards the vehicle floor FL from the seat cushion 71 moves in a longitudinal direction of the vehicle in conjunction with a vertical movement of the seat cushion 71.

In addition to the above, in order to reduce costs of the vehicle seat, the load sensor for detecting a seating load of the seat tends to be provided only at the rear portion of the seat cushion. Thus, the detected seating load may increase or decrease only by the vertical movement of the seat cushion. According to a method for simply comparing the load applied to the vehicle seat with a predetermined threshold value regardless of the height of the seat cushion, it may be difficult to precisely determine the seat occupancy state of the vehicle seat.

A need thus exists for an apparatus and a method for determining a seat occupancy state, which are not susceptible to the drawback mentioned above.

SUMMARY

According to an aspect of this disclosure, an apparatus for determining seat occupancy includes a seat for a vehicle, having a seating portion on which an occupant is seated, and a seat back arranged at a rear portion of the seating portion, right and left load detecting portions arranged between a vehicle floor and either one of a front portion and the rear portion of the seating portion, the right load detecting portion detecting a load applied to a right side of the seating portion, the left load detecting portion detecting a load applied to a left side of the seating portion, and a seat occupancy determining portion calculating a seating load of the seat on the basis of the loads detected by the right and left load detecting portions and determining the seat occupancy of the seat by comparing the seating load with a predetermined threshold value, the seat including right and left upper rails and right and left frames, the right and left upper rails being arranged on the vehicle floor and keeping a predetermined distance between each other, the right and left upper rails extending along a front-rear direction of the seat, the right and left frames being positioned at upper sides of the right and left upper rails, respectively, and connected thereto via a lift mechanism, the right and left frames configuring a portion of the seating portion, wherein one of the right and left frames receives a driving force via the lift mechanism to move the seating portion vertically relative to the vehicle floor, and the other of the right and left frames is supported by one of the right and left frames via the lift mechanism, and wherein the seat occupancy determining portion varies the predetermined threshold value depending on of a difference value between the load applied to the right side of the seating portion and the load applied to the left side of the seating portion.

According to another aspect of this disclosure, a method for determining seat occupancy, which is applied to a seat for a vehicle, including a seating portion, a seat back arranged at a rear portion of the seating portion, right and left upper rails, and right and left frames, the right and left upper rails arranged on a vehicle floor and keeping a predetermined distance between each other, the right and left upper rails extending along a front-rear direction of the seat, the right and left frames positioned at upper sides of the right and left upper rails, respectively, and connected thereto via a lift mechanism, the right and left frames configuring a portion of the seating portion, one of the right and left frames receiving a driving force via the lift mechanism to move the seating portion vertically relative to the vehicle floor, the other of the right and left frames being supported by one of the right and left frames via the lift mechanism, includes detecting loads applied to right and left sides, respectively, of either one of a front portion and the rear portion of the seating portion, calculating a seating load on the basis of the detected loads, and determining the seat occupancy of the seat by comparing the calculated seating load with a predetermined threshold value varying depending on a difference value between the loads applied to the right and left sides of the seating portion.

BRIEF DESCRIPTION OF THE DRAWINGS

The foregoing and additional features and characteristics of this disclosure will become more apparent from the following detailed description considered with the reference to the accompanying drawings, wherein.

DETAILED DESCRIPTION

A first embodiment of an apparatus for determining a seat occupancy state of a seat 1 for a vehicle will be described as follows with reference to FIGS. 1 to 6. In the description, a front direction, seen by an occupant seated on the seat 1, corresponds to a front side of the seat 1. Likewise, a rear direction, seen by the occupant seated on the seat 1, corresponds to a rear side of the seat 1. Further, a right direction, seen by the occupant seated on the seat 1, corresponds to a right side of the seat 1. Furthermore, a left direction, seen by the occupant seated on the seat 1, corresponds to a left side of the seat 1.

Figure 1:
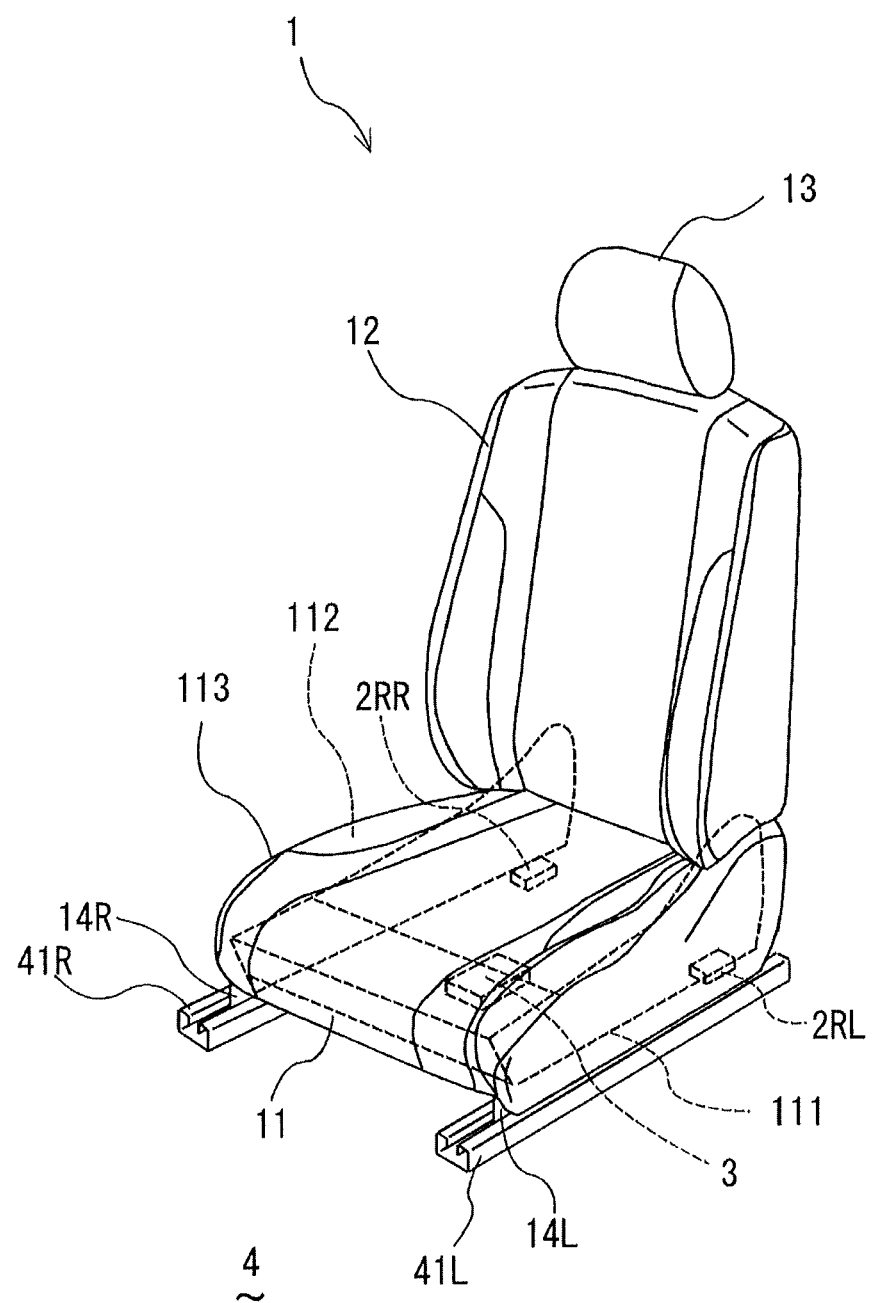
FIG. 1 is a perspective view illustrating a seat for a vehicle, on which an apparatus for determining a seat occupancy state according to a first embodiment is mounted.

As illustrated in FIG. 1, the seat 1 includes a seat cushion 11 serving as a seating portion, on which the occupant is seated, and a seat back 12 attached to a rear end portion (rear portion) of the seat cushion 11 so as to be rotatable in a front-rear direction of the vehicle and supporting the back of the occupant. A head rest 13 for supporting the head of the occupant is attached to a top end of the seat back 12.

The seat cushion 11 includes a seat frame 111, a pad member 112 arranged at an upper portion of the seat frame 111, and a cover 113 covering a surface of the pad member 112. A pair of upper rails (right and left upper rails) 14R and 14L extending in the front-rear direction of the vehicle is arranged at a lower surface of the seat frame 111 via a lift mechanism 15 which will be described below (see FIG. 2).

A pair of lower rails (right and left lower rails) 41R and 41L extending in the front-rear direction is fixed on a floor 4 of the vehicle while keeping a predetermine distance between each other. The floor 4 corresponds to a vehicle floor 4. The pair of upper rails (right and left upper rails) 14R and 14L of the seat 1 is engaged with the lower rails 41R and 41L, respectively, so as to be movable in the in the front-rear direction. Accordingly, the pair of upper rails 14R and 14L is arranged on the vehicle floor 4 while keeping a predetermined distance between each other. Thus, the seat 1 is formed to be movable in the front-rear direction on the vehicle floor 4 and fixable at a position desirably selected by the occupant.

Figure 2:
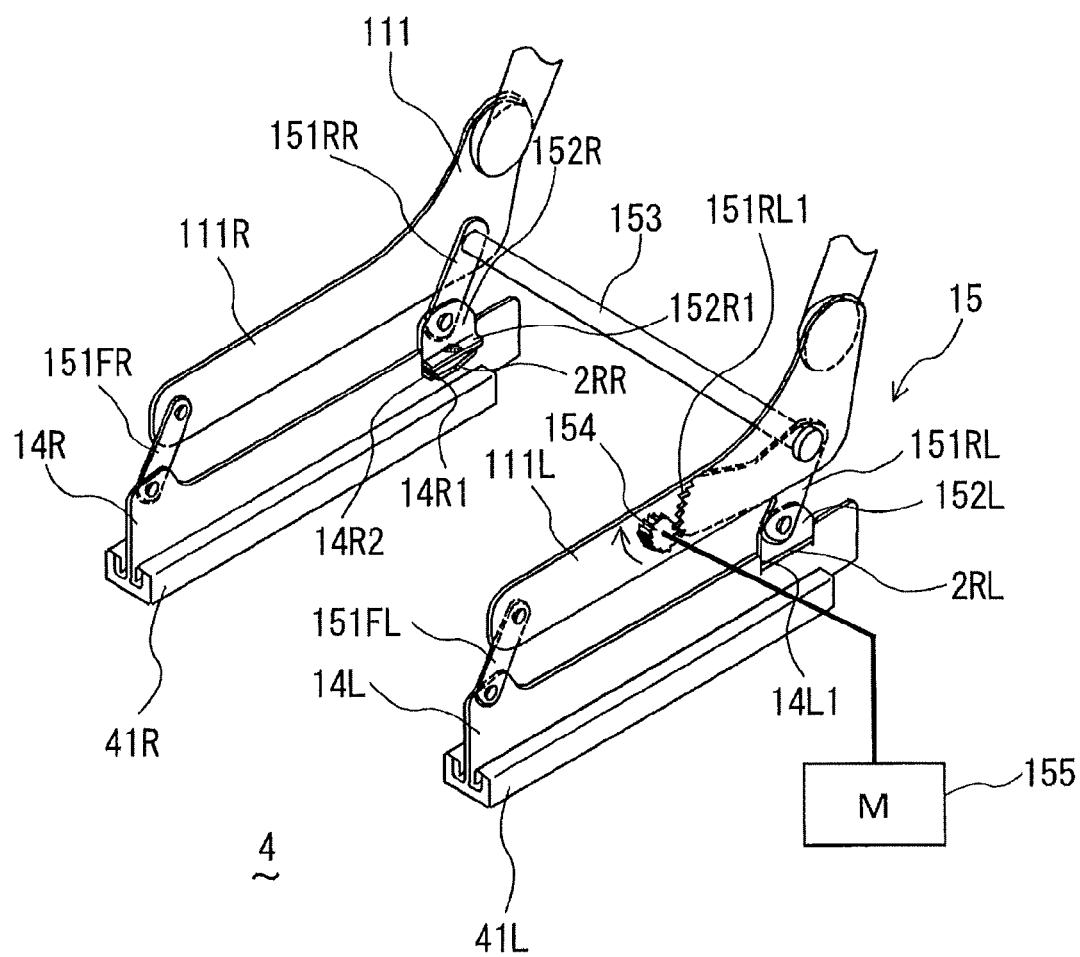
FIG. 2 is a perspective view illustrating an inner portion of a lower side of the seat of the vehicle shown in FIG. 1.

As shown in FIG. 2, the lift mechanism 15 for adjusting a height H of the seat cushion 11 of the seat 1 from the vehicle floor 4 is arranged between the lower surface of the seat frame 111 and the upper rails 14R and 14L. The lift mechanism 15 includes a longitudinal pair of a front right link 151FR and a rear right link 151RR and a longitudinal pair of a front left link 151FL and a rear left link 151RL. The front right link 151FR, the rear right link 151RR, the front left link 151FL, and the rear left link 151RL will be hereinafter referred to as links 151FR, 151RR, 151FL, and 151RL. The links 151FR, 151RR, 151FL, and 151RL connect the upper rails 14R and 14L to the seat frame 111 that is located above the upper rails 14R and 14L.

The link 151FR connects a front portion of a right frame member 111R (corresponding to a right frame configuring a portion of the seat frame 111) to the upper rail (right upper rail) 14R. Meanwhile, the link 151FL connects a front portion of a left frame member 111L (corresponding to a left frame configuring a portion of the seat frame 111) to the upper rail (left upper rail) 14L. Each of the right and left frame members 111R and 111L configures a portion of the seating portion 11.

Further, the links 151RR and 151RL arranged at rear portions of a pair of frame members 111R and 111L, respectively, are attached to the upper rails 14R and 14L by retainers 152R and 152L. The retainers 152R and 152L are accommodated within recessed portions 14R1 and 14L1 formed in the upper rails 14R and 14L, respectively. Each of the recessed portions 14R1 and 14L1 has an opening that faces upward in the vertical direction of the vehicle as seen in FIG. 2. Upper flange portions 152R1 and 152L1 extending inward in a width direction of the seat cushion 11 are integrally formed with lower surfaces of the retainers 152R and 152L, respectively (FIG. 2 shows the upper flange portion 152R1 only).

Furthermore, lower flange portions 14R2 and 14L2 are integrally formed with bottom surfaces of the recessed portions 14R1 and 14L1, respectively (FIG. 2 illustrates the lower flange portion 14R2 only). The lower flange portions 14R2 and 14L2 protrude inward in the width direction of the seat cushion 11 in the same way as the upper flange portions 152R1 and 152L1 while being facing the upper flange portions 152R1 and 152L1 in the vertical direction.

A rear right seat sensor 2RR serving as a right load detecting portion is provided between the upper flange portion 152R1 and the lower flange portion 14R2 while a rear left seat sensor 2RL serving as a left load detecting portion is provided between the upper flange portion 152L1 and the lower flange portion 14L2. The rear right seat sensor 2RR and the rear left seat sensor 2RL will be hereinafter referred to as seat sensors 2RR and 2RL. Details of the seat sensors 2RR and 2RL will be explained below. The links 151FR and 151RR are attached to the upper rail 14R so as to be rotatable relative to the frame member 111R in a condition where the link 151RR is rotatable to the retainer 152R. The links 151FL and 151RL are attached to the upper rail 14L so as to be rotatable relative to the frame member 111L in a condition where the link 151RL is rotatable to the retainer 152L.

The pair of frame members 111R and 111L in the width direction of the seat cushion 11 is connected to each other by a connecting rod 153 of the lift mechanism 15. The links 151RR and 151RL are fixed to both ends of the connecting rod 153 by welding and the like. Thus, the links 151RR and 151RL, and the connecting rod 153 integrally form the lift mechanism 15 having rigidity. The both ends of the connecting rod 153 are pivotally supported by respective rear portions of the pair of frame members 111R and 111L in a condition where a distance between the frame members 111R and 111L is unchanged. As illustrated in FIG. 2, an intermediate portion of the link 151RL has a bent shape. A gear tooth portion 151RL1 is formed at a front end portion of the link 151RL. A pinion gear 154 is rotatably attached to a left lateral surface of the frame member 111L. A rotary shaft of the pinion gear 154 extends in a width direction of the vehicle 1 and engages with the gear tooth portion 151RL1 formed at the link 151RL. The pinion gear 154 is driven by an electric motor 155.

Thus, the frame member 111L is movably supported by the link 151RL and the pinion gear 154 at an upper side of the electric motor 155 having a rotor that is not in a rotational state. The frame member 111R is movably supported by the frame member 111L via the connecting rod 153, the link 151RL, the pinion gear 154, and the electric motor 155.

According to the configuration as described above, the lift mechanism 15 is operated by the occupant seated on the seat 1 to thereby activate the electric motor 155. Then, the pinion gear 154 is driven by the electric motor 155 so as to rotate in a clockwise direction seen in FIG. 2 (the clockwise direction is indicated by an arrow), thereafter rotating the link 151RL about an attaching portion of the link 151RL relative to the retainer 152L. Accordingly, the frame member 111L is moved upward in an obliquely forward direction while the posture of frame member 111L in an approximately horizontal direction is maintained by the link 151FL. The frame member 111R connected to the frame member 111L by the connecting rod 153 is moved upward in the obliquely forward direction along with the frame member 111L while the posture of the frame member 111R in the approximately horizontal direction is maintained by the links 151FR and 151RR.

Meanwhile, in the condition where the frame members 111R and 111L are moved upward, the pinion gear 154 is rotated by the electric motor 155 so as to rotate in a counterclockwise direction seen in FIG. 2 (the counterclockwise direction is an opposite direction to the direction indicated by the arrow in FIG. 2). At this time, the link 151RL is rotated in the opposite direction to the rotating direction described above. Consequently, the frame member 111L is moved downward in an obliquely rearward direction while the posture of the frame member 111L is maintained by the link 151FL. The frame member 111R is moved downward in the obliquely rearward direction along with the frame member 111L while the posture of the frame member 111R in the approximately horizontal direction is maintained by the links 151FR and 151RR.

Thus, a pair of seat sensors 2RR and 2RL is a load sensor formed by a strain gauge and the like. The seat sensors 2RR and 2RL detect a load applied to the seat cushion 11 in a downward direction of the vehicle, for example, when the occupant is seated on the seat 1 or when luggage is placed on the seat 1. In the first embodiment, the load detected by the seat sensors 2RR and 2RL is referred to as a seating load applied to the seat cushion 11, regardless of any loads applied when the occupant is seated on the seat 1, when a child seat is attached to the seat 1, or when the luggage is placed on the seat 1. In addition, types, configurations, and detection principles of the seat sensors 2RR and 2RL are not specifically specified in the first embodiment.

As shown in FIG. 1, the seat sensors 2RR and 2RL are formed at the rear portion of the seat cushion 11 (between the rear portion of the seat cushion 11 and the vehicle floor 4) while keeping a predetermined distance between each other in the width direction of the seat cushion 11. The seat sensor 2RR is positioned between the retainer 152R connected to the link 151RR and the upper rail 14R while detecting a load applied to a right side of the seat cushion 11. Likewise, the seat sensor 2RL is positioned between the retainer 152L connected to the link 151 RL and the upper rail 14L while detecting a load applied to a left side of the seat cushion 11.

Figure 3:
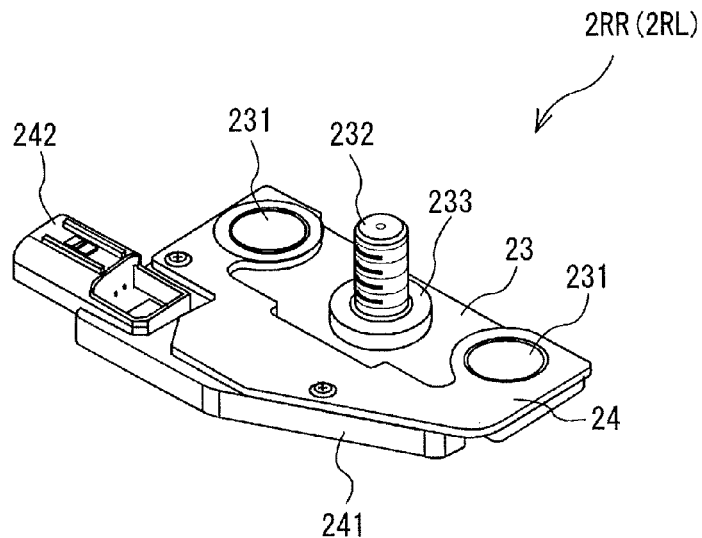
FIG. 3 is an enlarged view of a seat sensor shown in FIG. 1.

Details of the seat sensors 2RR and 2RL will be described as follows with reference to FIG. 3. As illustrated in FIG. 3 that shows the seat sensor 2RR only, the seat sensor 2RR includes an elastic body 23 formed by metal, a bracket 24 supporting the elastic body 23, and a case 241 formed at a lower surface of the bracket 24. A strain gauge configuring a sensing portion 21 RR which will be described below is attached to a lower surface of the elastic body 23. Further, a signal amplifying portion 22RR which will be described below is accommodated within the case 241. A connector 242 is integrally formed at a frond end of the case 241 (the front end of the case 241 is to the left in FIG. 3 while a rear end of the case 241 is to the right in FIG. 3). The seat sensor 2RR is connected to a controller 3 by the connector 242.

Attachment holes to which bushes 231 are attached are formed in the front and rear ends of the case 241, respectively. Attachment bolts vertically arranged at the lower flange portion 14R2 are inserted from a lower side of the bracket 24 into the bushes 231 and tightening nuts are screwed with the bracket 24 from an upper side of the bracket 24 (upper and lower sides of the bracket 24 are seen in a vertical direction in FIG. 3). Accordingly, the elastic body 23 is attached on the upper rail 14R. Under a condition where the elastic body 23 is attached on the upper rail 14R, a sufficient clearance is formed between the elastic body 23 and the lower flange portion 14R2 by the thickness of the bushes 231 positioned at a lower side of the elastic body 23.

Further, a stud bolt 232 is attached to an intermediate portion of the elastic body 23. A spacer 233 is attached to the stud bolt 232 so as to be positioned on an upper surface of the elastic body 23. The stud bolt 232 is inserted from a lower side of the upper flange portion 152R1 of the retainer 152 into an attachment hole formed in a lower surface of the upper flange portion 152R1. Then, a nut member is fixed to the stud bolt 232 from an upper side of the upper flange portion 152R1; thereby, the elastic body 23 is placed at the lower side of the upper flange portion 152R1. In a condition where the elastic body 23 is placed at the lower side of the upper flange portion 152R1, a sufficient clearance is formed between the elastic body 23 and the upper flange portion 152R1 by the thickness of the spacer 233.

According to the configuration of the seat sensors 2RR and 2RL as described above, the elastic body 23 of each of the seat sensors 2RR and 2RL is formed so as to be strained in the vertical direction by a change of a relative position between the retainer 152R, 152L and the upper rail 14R, 14L. The intermediate portion of the elastic body 23, corresponding to an attachment portion of the stud bolt 232, is pressed in the downward direction of the vehicle to be brought in a compressed state; therefore, each of the seat sensors 2RR and 2RL detects the load applied to the seat cushion 11 in the downward direction. In addition, the seat sensor 2RR shown in FIG. 3 has a symmetric shape relative to the seat sensor 2RL.

Figure 4:
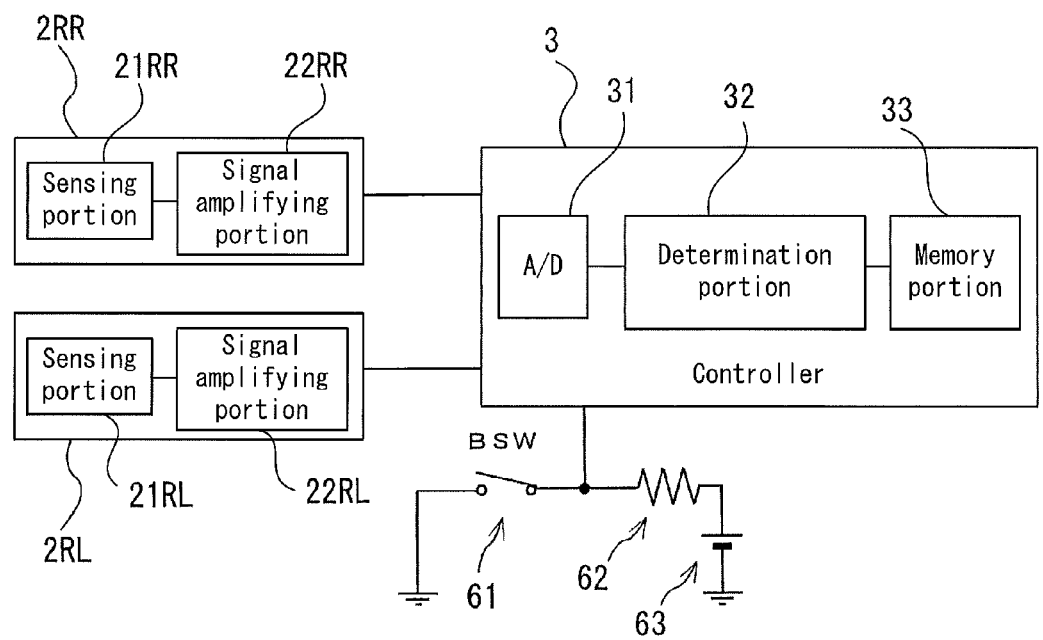
FIG. 4 is a block diagram illustrating an overview of the seat sensor.

As illustrated in FIG. 4, the seat sensor 2RR includes the sensing portion 21RR and the signal amplifying portion 22RR while the seat sensor 2RL includes a sensing portion 21RL and a signal amplifying portion 22RL. The signal amplifying portions 22RR and 22RL amplify signals generated by the seat sensors 2RR and 2RL, respectively. Each of the sensing portions 21RR and 21RL is formed by a Wheatstone bridge circuit that includes four strain gauges described above.

The seat sensors 2R and 2L are connected to the controller 3 (serving as a seat occupancy determining portion). The controller 3 includes an A/D converter 31, which converts detection signals outputted from the seat sensors 2RR and 2RL to digital signals, a determination portion 32, which determines the seat occupancy state on the basis of the detection signals, and a memory portion 33, which memorizes data required to determine the seat occupancy state. A map MP1 including data of threshold values W1, W2, W3, and W4 that will be described below, is stored in the memory portion 33.

Further, a buckle switch 61 of a seat belt device is connected to the controller 3. A battery 63 of the vehicle is connected to the buckle switch 61 via a direct-current resistor 62. The seat belt device includes a buckle and a tongue plate. When the buckle is not engaged with the tongue plate to bring the buckle switch 61 into an open state, an electric current does not flow through the direct-current resistor 62; therefore, the controller 3 detects a positive terminal voltage (high) of the battery 63.

When the buckle is engaged with the tongue plate to bring the buckle switch 61 in a closed state, the electric current flows through the direct-current resistor 62; therefore, the controller 3 detects a decrease in voltage (low) of the battery 63. As a result, the controller 3 determines that the buckle is engaged with the tongue plate and that the occupant is fastened to the seat 1 by the seat belt device.

Figure 5:
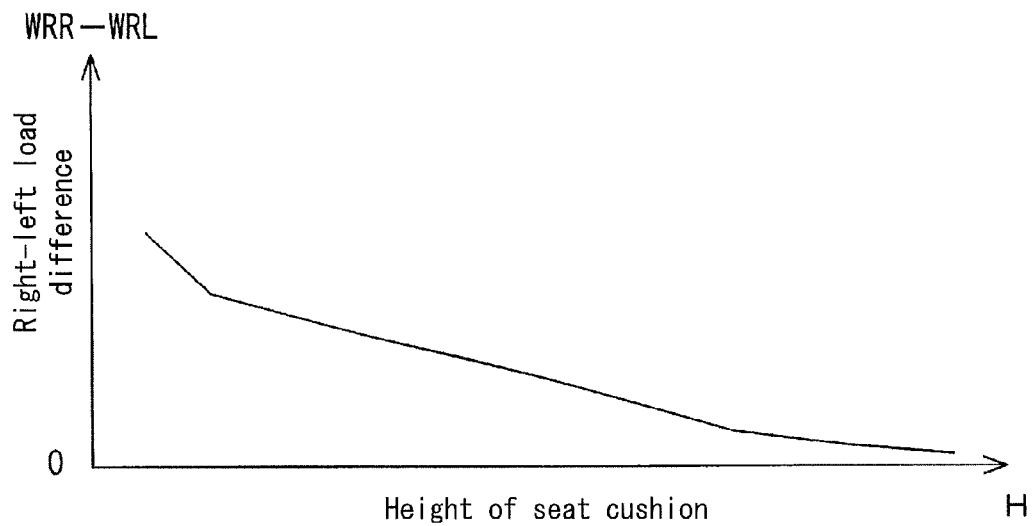
FIG. 5 is a graph showing a relation between a height of a seat cushion of the seat and a difference value between loads applied to right and left sides of the seat cushion.

Next, how to determine the seat occupancy state of the seat 1 will be described as follows with reference to FIG. 5 and FIG. 6. In addition, a state where the child seat is attached on the seat 1 and the buckle and the tongue plate of the seat belt device are engaged with each other to thereby fix the child seat to the seat 1 will be hereinafter referred to as a child seat fastened state of the seat 1. Furthermore, a state where an adult occupant is seated on the seat 1 will be referred to as an adult occupant seated state of the seat 1.

The controller 3 calculates a difference value of loads applied to the right and left sides (i.e. right and left loads) of the seat cushion 11 by subtracting the left load detected by the seat sensor 2RL from the right load detected by the seat sensor 2RR (hereinafter, the right load detected by the seat sensor 2RR will be referred to as a load WRR while the left load detected by the seat sensor 2RL will be referred to as a load WRL). The aforementioned difference value of the loads WRR and WRL will be hereinafter referred to as a right-left load difference WRR−WRL. As shown in FIG. 5, the right-left load difference WRR−WRL decreases as the height H of the seat cushion 11 from the vehicle floor 4 in the vertical direction increases. This is because a seating load acting on the seat cushion 11 shifting forward in the front-rear direction in accordance with the height H of the seat cushion 11 is assumed to lead to a decrease of a total of the loads WRR and WRL (i.e., a total load WRR+WRL) detected by the seat sensors 2RR and 2RL. Such decrease of the total load WRR+WRL will be explained below.

In the seat 1 including the lift mechanism 15, the frame members 111R and 111L of the seat frame 111 serve as driven and driving members, respectively. For example, in a case where the frame member 111R serving as the driven member is moved in accordance with the movement of the frame member 111L serving as the driving member, the right-left load difference WRR−WRL occurs between the right and left sides of the seat cushion 11 when the seat cushion 11 is moved upward. The occurrence of the right-left load difference WRR−WRL results from the following phenomenon: the connecting rod 153 and the like provided between the frame members 111R and 111L are distorted in order to support the frame member 111R serving as the driven member; therefore, the movement of the frame member 111R is delayed relative to the movement of the frame member 111L serving as the driving member. That is, a force such as a moment acting in a downward direction of the vehicle and distorting the connecting rod 153 is applied to thereto by the loads of the seat cushion 11 and the occupant seated on the seat cushion 11; therefore, the link 151RR arranged at the frame member 111R serving as the driven member is prevented from rotating about an attaching portion of the link 151RR relative to the retainer 152R in conjunction with the rotation of the ling 151RL. As a result, a difference of rotation angles between the links 151RR and 151RL occurs.

Further, as the seat cushion 11 is moved upward, the load applied to the seat cushion 11 shifts forward in the front-rear direction. Accordingly, the delay of the movement of the frame member 111R relative to the frame member 111L is assumed to vary the right-left load difference WRR−WRL depending on the height H of the seat cushion 11. As illustrated in FIG. 5, as the height H of the seat cushion 11 increases, the right-left load difference WRR−WRL decreases. As a result, the height H of the seat cushion 11 may be determined by the size of the right-left load difference WRR−WRL.

In addition, the controller 3 calculates the total load WRR+WRL by adding the load WRR detected by the seat sensor 2RR to the load WRL detected by the seat sensor 2RL. The controller 3 uses the map MP1 illustrated in FIG. 6 to determine on the basis of the total load WRR+WRL and the right-left load difference WRR−WRL whether the seat 1 is in the child seat fastened state or the adult occupant seated state. The total load WRR+WRL corresponds to the seating load applied to the seat cushion 11 according to the first embodiment.

Figure 6:
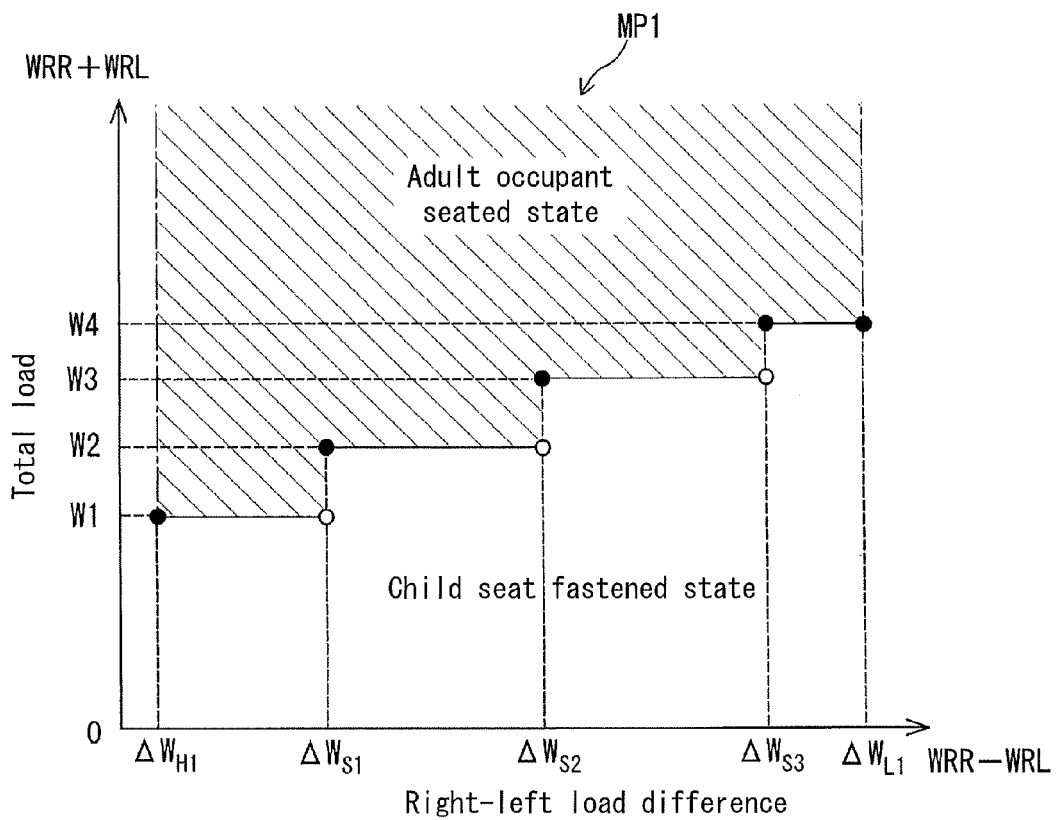
FIG. 6 is a graph showing a map used for determining the seat occupancy state according to the first embodiment.

The map MP1 shown in FIG. 6 has a horizontal axis (one axis) on which the right-left load difference WRR−WRL calculated by the controller 3 is shown and a vertical axis (the other axis) on which the total load WRR+WRL is shown. Threshold values W1, W2, W3, and W4 predetermined on the basis of the right-left load difference WRR−WRL are formed in the map MP1. In FIG. 6, coordinate points positioned in unfilled circles are not included in line segments indicating the threshold values W1, W2, W3, and W4, respectively. Meanwhile, coordinate points positioned in filled circles are included in line segments indicating the threshold values W1, W2, W3, and W4, respectively. Alternatively, the map MP1 shown in FIG. 6 may have the vertical axis on which the right-left load difference WRR−WRL is shown and the horizontal axis on which the total load WRR+WRL is shown.

The seat cushion 11 in FIG. 6 is moved upward and downward (vertically) between the lowest and highest positions of the seat cushion 11. When the seat cushion 11 is in the lowest position, the right-left load difference WRR−WRL is a maximum value $\Delta W_{L1}$. When the seat cushion 11 is in the highest position, the right-left load difference WRR−WRL is a minimum value $\Delta W_{H1}$. When a combination of the total load WRR+WRL and the right-left load difference WRR−WRL that are detected by the seat sensors 2RR and 2RL is within a hatching area in FIG. 6, the controller 3 determines that the seat 1 is in the adult occupant seated state. Meanwhile, when the combination of the total load WRR+WRL and the right-left load difference WRR−WRL is out of the hatching area in FIG. 6 and when the buckle switch 61 is turned on (in ON-state), the controller 3 determines that the seat 1 is in the child seat fastened state.

In otherwise, when the buckle switch 61 is in ON state and when the total load WRR+WRL is less than the predetermined threshold values W1, W2, W3, and W4, the controller 3 determines that the seat 1 is in the child seat fastened state. Meanwhile, when the total load WRR+WRL is equal to or greater than the threshold values W1, W2, W3, and W4, the controller 3 determines that the seat 1 is in the adult occupant seated state. In addition, the threshold values W1, W2, W3, and W4 will be collectively referred to as threshold values W1 to W4 hereinafter.

The threshold values W1 to W4 are determined in accordance with the right-left load difference WRR−WRL as in the map MP1 shown in FIG. 6. When the right-left load difference WRR−WRL is within a predetermined range, the threshold values W1 to W4 are set to be constant values, Lines indicating the threshold values W1 to W4 in FIG. 6 are shown in a stepwise manner.

When the right-left load difference WRR−WRL is equal to or greater than $\Delta W_{H1}$ and less than $\Delta W_{S1}$ ($\Delta W_{H1} \leq$ WRR−WRL $< \Delta W_{S1}$), a threshold value for the seating load is set to be the threshold value W1. When the right-left load difference WRR−WRL is equal to or greater than $\Delta W_{S1}$ and less than $W_{S2}$ ($\Delta W_{S1} \leq$ WRR−WRL $< W_{S2}$), the threshold value for the seating load is set to be the threshold value W2. When the right-left load difference WRR−WRL is equal to or greater than $\Delta W_{S2}$ and less than $\Delta W_{S3}$ ($\Delta W_{S2} \leq$ WRR−WRL $< W_{S3}$) the threshold value for the seating load is set to be the threshold value W3. When the right-left load difference WRR−WRL is equal to or greater than $W_{S3}$ and equal to or less than $\Delta W_{L1}$ ($\Delta W_{S3} \leq$ WRR−WRL $\leq \Delta W_{L1}$), the threshold value for the seating load is set to be the threshold value W4. As clearly understood from FIG. 6, as the right-left load difference WRR−WRL increases, the threshold values W1 to W4 are set to increase.

Thus, in a case where the right-left load difference WRR−WRL is equal to or greater than $W_{H1}$ and less than $\Delta W_{S1}$ ($\Delta W_{H1} \leq$ WRR−WRL $< \Delta W_{S1}$), when the total load WRR+WRL that is computed by the controller 3 is equal to or greater than the threshold value W1 (W1≤WRR+WRL), the controller 3 determines that the seat 1 is in the adult occupant seated state. Further, in a case where the right-left load difference WRR−WRL is equal to or greater than $\Delta W_{H1}$ and less than $\Delta W_{S1}$ ($\Delta W_{H1} \leq$ WRR−WRL $< \Delta W_{S1}$), when the total load WRR+WRL that is computed by the controller 3 is less than the threshold value W1 (WRR+WRL<W1) and when the buckle switch 61 is in ON state, the controller 3 determines that the seat 1 is in the child seat fastened state.

In a case where the right-left load difference WRR−WRL is equal to or larger than $\Delta W_{S1}$ and less than $\Delta W_{S2}$ ($\Delta W_{S1} \leq$ WRR−WRL $< \Delta W_{S2}$), when the total load WRR+WRL that is computed by the controller 3 is equal to or greater than the threshold value W2 (W2≤WRR+WRL), the controller 3 determines that the seat 1 is in the adult occupant seated state. Further, in a case where the right-left load difference WRR−WRL is equal to or larger than $\Delta W_{S1}$ and less than $\Delta W_{S2}$ ($\Delta W_{S1} \leq$ WRR−WRL $< W_{S2}$), when the total load WRR+WRL that is computed by the controller 3 is less than the threshold value W2 (WRR−WRL<W2) and when the buckle switch 61 is in ON state, the controller 3 determines that the seat 1 is in the child seat fastened state.

In a case where the right-left load difference WRR−WRL is equal to or greater than $\Delta W_{S2}$ and less than $\Delta W_{S3}$ ($\Delta W_{S2} \leq$ WRR−WRL $< \Delta W_{S3}$), when the total load WRR+WRL that is computed by the controller 3 is equal to or greater than the threshold value W3 (W3≤WRR+WRL), the controller 3 determines that the seat 1 is in the adult occupant seated state. Further, in a case where the right-left load difference WRR−WRL is equal to or greater than $\Delta W_{S2}$ and less than $\Delta W_{S3}$ ($\Delta W_{S2} \leq$ WRR−WRL $< \Delta W_{S3}$), when the total load WRR+WRL that is computed by the controller 3 is less than the threshold value W3 (WRR+WRL<W3) and when the buckle switch 61 is in ON state, the controller 3 determines that the seat 1 is in the child seat fastened state.

In a case where the right-left load difference WRR−WRL is equal to or greater than $\Delta W_{S3}$ and equal to or less than $\Delta W_{L1}$ ($\Delta W_{S3} \leq$ WRR−WRL $\leq \Delta W_{L1}$), when the total load WRR+WRL that is computed by the controller 3 is equal to or greater than the threshold value W4 (W4≤WRR+WRL), the controller 3 determines that the seat 1 is in the adult occupant seated state. Further, in a case where the right-left load difference WRR−WRL is equal to or greater than $\Delta W_{S3}$ and equal to or less than $\Delta W_{L1}$ ($\Delta W_{S3} \leq$ WRR−WRL $\leq \Delta W_{L1}$), when the total load WRR+WRL that is computed by the controller 3 is less than the threshold value W4 (WRR+WRL<W4) and when the buckle switch 61 is in ON state, the controller 3 determines that the seat 1 is in the child seat fastened state.

After determining that the seat 1 is in the child seat fastened state, the controller 3 transmits the determination result to an ECU for an air-bag (hereinafter, the ECU for the air-bag will be referred to as an air-bag ECU). Then, the air-bag is controlled by the air-bag ECU so as not to be fully deployed. Meanwhile, after determining that the seat 1 is in the adult occupant seated state, the controller 3 transmits the determination result to the air-bag ECU. Then, the air-bag is controlled by the air-bag ECU so as to be fully deployed.

According to the first embodiment, the controller 3 sets the threshold value for the seating load at the threshold value W1, W2, W3, or W4 depending on the right-left load difference WRR−WRL; thereby, the controller 3 precisely determines that the seat occupancy state of the seat 1 even when the seating load shifts in the front-rear direction due to the variation of the height H of the seat cushion 11. Further, when the seating load equal to or greater than the threshold values W1 to W4 is detected by the seat sensors 2RR and 2RL, the controller 3 determines that the seat 1 is in the adult occupant seated state. Meanwhile, when the seating load less than the threshold values W1 to W4 is detected by the seat sensors 2RR and 2RL, the controller 3 determines that the seat 1 is in the child seat fastened state. Thus, for example, the controller 3 accurately distinguishes the adult occupant seated state in which the air-bag is controlled by the air-bag ECU so as to be fully deployed from the child seat fastened state in which the air-bag is controlled by the air-bag ECU so as not to be fully deployed.

Additionally, according to the first embodiment, the seat sensors 2RR and 2RL are arranged at the right and left sides of the seat cushion 11 and loads detected by the seat sensors 2RR and 2RL are summed to be determined as the seating load. Thus, even when a difference between the loads detected by the seat sensors 2RR and 2RL occurs, the seating load of the seat 1 may be precisely determined by the controller 3. Further, according to the first embodiment, the seat sensors 2RR and 2RL are attached to the rear portion of the seat cushion 11 and the threshold values W1 to W4 are set to decrease as the right-left load difference WRR−WRL decreases. Accordingly, the seat occupancy state of the seat 1 may be accurately determined regardless of whether or not the seating load shifts toward the front side of the vehicle in conjunction with the vertical movement of the seat cushion 11.

Moreover, according to the first embodiment, the seat sensors 2RR and 2RL are attached to the rear portion of the seat cushion 11; therefore, a load of the occupant or the child seat is easily applied to the seat sensors 2RR and 2RL. Accordingly, even when the seat sensors 2RR and 2RL are not arranged at a front portion of the seat cushion 11, the load applied to the seat cushion 11 may be accurately detected. In addition, the seat occupancy state of the seat 1 is accurately determined and costs of the seat 1 are reduced by the elimination of the seat sensors 2RR and 2RL at the front portion of the seat cushion 11. In addition, according to the first embodiment, the controller 3 determines whether the seat 1 is in the adult occupant seated state or the child seat fastened state, on the basis of the map MP1 having the horizontal axis on which the right-left load difference WRR−WRL is shown and the vertical axis on which the total load WRR+WRL is shown. As a result, the seat occupancy state of the seat 1 may be determined shortly by means of only a few calculations.

Figure 7:
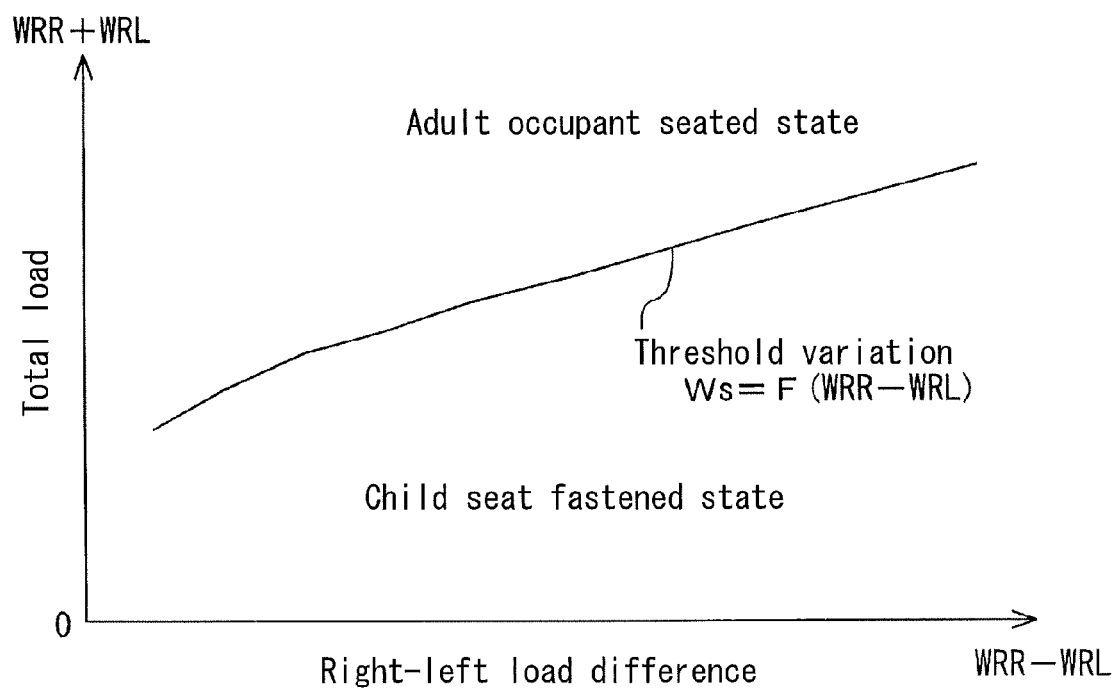
FIG. 7 is a graph showing a variation of a threshold value obtained from a function, which is used for determining the seat occupancy state according to a modified example of the first embodiment.

A modified example of the first embodiment will be described with reference to FIG. 7 showing a graph indicating a variation of a threshold value $W_S$ obtained from a function: $W_S=F$ (WRR−WRL), which is used for determining the seat occupancy state of the seat 1. The function: $W_S=F$(WRR−WRL) determines the threshold value $W_S$ for the total load WRR+WRL on the basis of the right-left load difference WRR−WRL calculated by the controller 3. The function: $W_S=F$ (WRR−WRL) is stored in the memory portion 33. As shown in FIG. 7, as the right-left load difference WRR−WRL increases, the threshold value for the total load WRR+WRL increases.

According to the modified example of the first embodiment, the right-left load difference WRR−WRL calculated by the controller 3 is assigned to the function: $W_S=F$(WRR−WRL) to thereby obtain the threshold value W. After the threshold value $W_S$ is set, the threshold value $W_S$ is compared with the total load WRR+WRL; thereby, the seat occupancy state of the seat 1 is determined. At this time, for example, when the total load WRR+WRL is equal to or greater than the threshold value $W_S$ ($W_S \leq$ WRR+WRL), the controller 3 determines that the seat 1 is in the adult occupant seated state. Meanwhile, when the total load WRR+WRL is less than the threshold value $W_S$ (WRR+WRL<$W_S$) and when the buckle switch 61 is in ON state, the controller 3 determines that the seat 1 is in the child seat fastened state. The function: $W_S=F$ (WRR−WRL) is formed by the right-left load difference WRR−WRL and the total load WRR+WRL that are detected by the seat sensors 2RR and 2RL when the height H of the seat cushion 11 is experimentally changed. Alternatively, the function: $W_S=F$(WRR−WRL) is formed by a geometrical calculation and the like regarding the lift mechanism 15.

According to the modified example of the first embodiment, the function: $W_S=F$(WRR−WRL) is utilized to determine the threshold value $W_S$ for the seating load on the basis of the right-left load difference WRR−WRL; thereby, a relation between the right-left load difference WRR−WRL and the threshold $W_S$ approximates the function: $W_S=F$(WRR−WRL). As a result, the threshold value $W_S$ is easily determined in accordance with the right-left load difference WRR−WRL.

Figure 8:
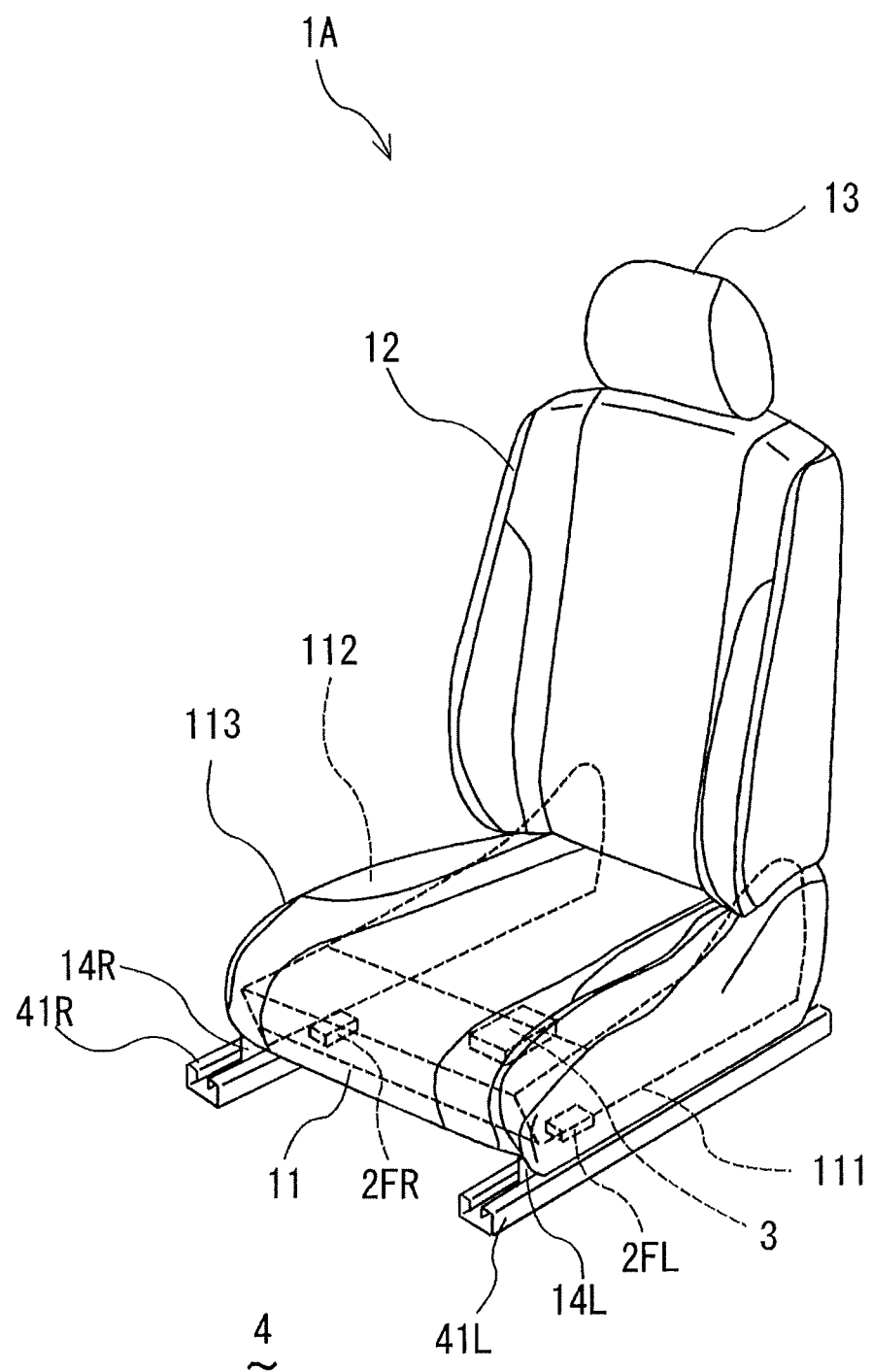
FIG. 8 is a perspective view illustrating the seat on which the apparatus for determining the seat occupancy state according to a second embodiment is mounted.

Next, a second embodiment of the apparatus for the determining the seat occupancy state will be explained as follows with reference to FIGS. 8 to 10. As illustrated in FIG. 8, the second embodiment differs from the first embodiment only in that a front right seat sensor 2FR serving as the right load detecting portion and a front left seat sensor 2FL serving as the left load detecting portion are provided at the front portion of the seat cushion 11 of a seat 1A for the vehicle. The front right seat sensor 2FR and the front left seat sensor 2FL will be collectively referred to as the seat sensors 2FR and 2FL hereinafter.

Each of the seat sensors 2FR and 2FL serves as a load sensor formed by a strain gauge and the like. Types, configurations, and detection principles of the seat sensors 2FR and 2FL are the same as those of the seat sensors 2RR and 2RL of the first embodiment. The seat sensors 2FR and 2FL are provided at the right and left sides of the seat cushion 11, respectively, of the front portion of the seat cushion 11 while keeping a predetermined distance between each other in the width direction. In particular, the seat sensor 2FR is provided between the right upper rail 14R and the link 151FR while the seat sensor 2FL is provided between the left upper rail 14L and the link 151FL. The seat sensors 2FR and 2FL are connected to the controller 3 in the same way as the seat sensors 2RR and 2RL of the first embodiment.

The controller 3 according to the second embodiment adds a load WFR detected by the seat sensor 2FR to a WFL detected by the seat sensor 2FL in the same way as in the first embodiment, thereby calculating a total of loads WFR and WFL (i.e., a total load WFR+WFL). Further, the controller 3 L calculates a difference value of loads between the right and left sides of the seat cushion 11 by subtracting the load WFR detected by the seat sensor 2FR from the load WFL detected by the seat sensor 2FL. The difference value of the loads between the right and left sides of the front portion of the seat cushion 11 will be hereinafter referred to as a left-right load difference WFL−WFR.

The second embodiment differs from the first embodiment in that the seat sensors 2FR and 2FL are arranged at the front portion of the sea cushion 11. Accordingly, in the second embodiment, the load WFL detected by the seat sensor 2FL is greater than the load WFR detected by the seat sensor 2FR because of the delay of the movement of the frame member 111R relative to the frame member 111L. Consequently, according to the second embodiment, the controller 3 calculates the left-right load difference WFL−WFR by subtracting the load WFR detected by the seat sensor 2FR from the load WFL detected by the seat sensor 2FL. The controller 3 uses a map MP2 shown in FIG. 2 to determine on the basis of the total load WFR+WFL and the left-right load difference WFL−WFR whether the seat 1A is in the child seat fastened state or the adult occupant seated state. In addition, the total load WFR+WFL corresponds to the seating load.

Figure 9:
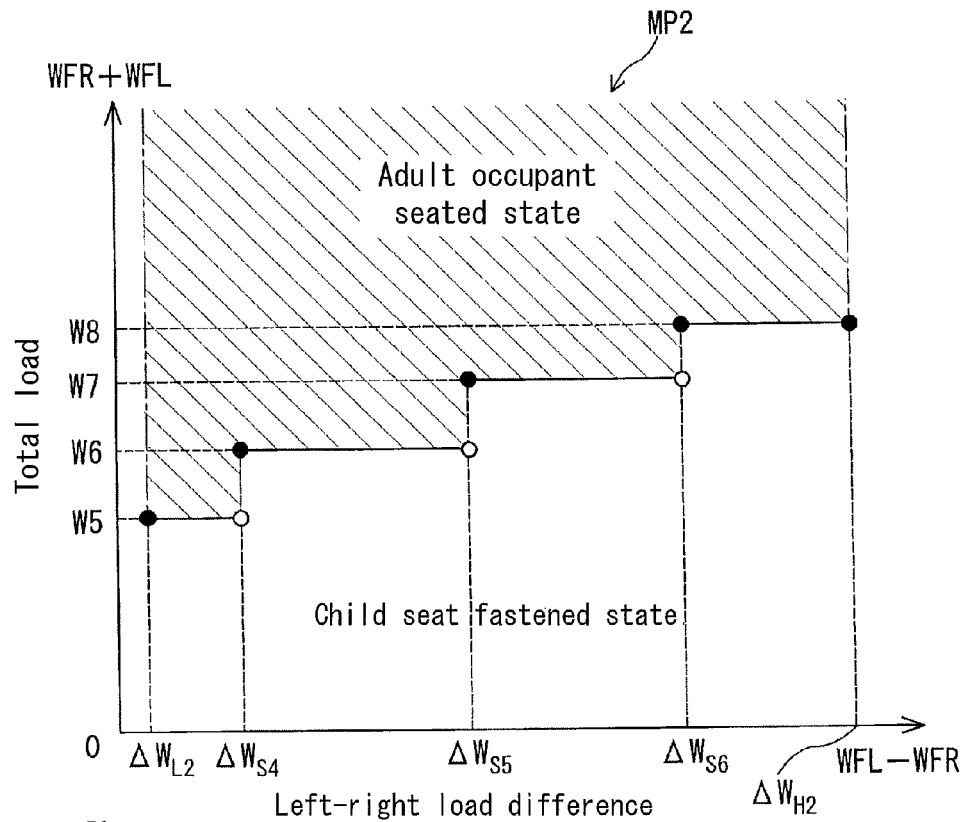
FIG. 9 is a graph showing a map used for determining the seat occupancy state according to the second embodiment.

The map MP2 shown in FIG. 9 has a horizontal axis (one axis) on which the left-right load difference WFL−WFR calculated by the controller 3 is shown and a vertical axis (the other axis) on which the total load WFR+WFL is shown. Threshold values W5, W6, W7, and W8 predetermined on the basis of the left-right load difference WFL−WFR are formed in the map MP2. Alternatively, the map MP2 shown in FIG. 9 may have the vertical axis on which the left-right load difference WFL−WFR is shown and the horizontal axis on which the total load WFR+WFL is shown. In addition, the threshold values W5, W6, W7, and W8 will be collectively referred to as threshold values W5 to W8 hereinafter.

The seat cushion 11 in FIG. 9 is moved upward and downward (vertically) between the lowest and highest positions of the seat cushion 11. When the seat cushion 11 is in the lowest position, the left-right load difference WFL−WFR is a minimum value $\Delta W_{L2}$. When the seat cushion 11 is in the highest position, the right-left load difference WFR−WFL is a maximum value $\Delta W_{H2}$. When a combination of the total load WRR+WRL and the left-right load difference WFL−WFR that are detected by the seat sensors 2FR and 2FL is within a hatched area in FIG. 9, the controller 3 determines that the seat 1A is in the adult occupant seated state. Meanwhile, when the combination of the total load WFR+WFL and the left-right load difference WRL−WRR is out of the hatched area in FIG. 9 and when the buckle switch 61 is turned on (in ON-state), the controller 3 determines that the seat 1A is in the child seat fastened state.

When the left-right load difference WFL−WFR is equal to or greater than $\Delta W_{L2}$ and less than $\Delta W_{S4}$ ($\Delta W_{L2} \leq$ WFL−WFR$< \Delta W_{S4}$), the threshold value for the seating load is set to be the threshold value W5. When the left-right load difference WFL−WFR is equal to or greater than $\Delta W_{S4}$ and less than $\Delta W_{S5}$ ($\Delta W_{S4} \leq$ WRR−WRL$< \Delta W_{S5}$), the threshold value for the seating load is set to be the threshold value W6. When the left-right load difference WFL−WFR is equal to or greater than $\Delta W_{S5}$ and less than $\Delta W_{S6}$ ($\Delta W_{S5} \leq$ WFL−WFR$< \Delta W_{S6}$), the threshold value for the seating load is set to be the threshold value W7. When the left-right load difference WFL−WFR is equal to or greater than $W_{S6}$ and equal to or less than $\Delta W_{H2}$ ($\Delta W_{S6} \leq$ WRR−WRL$\leq \Delta W_{H2}$), the threshold value for the seating load is set to be the threshold value W8.

As clearly understood from FIG. 9, according to the second embodiment, as the left-right load difference WFL−WFR increases, the threshold values W5 to W8 are set to increase in the same way as in the first embodiment. Since the seat sensors 2FR and 2FL are arranged at the front portion of the seat cushion 11 in the second embodiment, not only the seating load detected by the seat sensors 2FR and 2FL but also the right-left load difference WFL−WFR increases as the height H of the seat cushion 11 increases. Accordingly, as described above, the threshold values W5 to W8 are set to increase as the height H of the seat cushion 11 increases.

Figure 10:
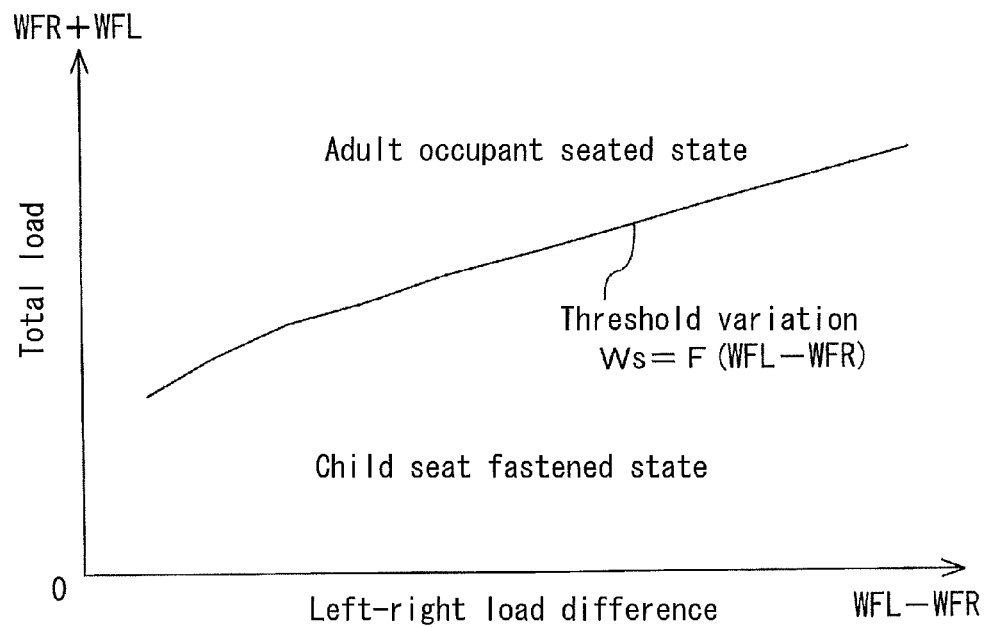
FIG. 10 is a graph showing a variation of a threshold value obtained from a function, which is used for determining the seat occupancy state according to the second embodiment.

FIG. 10 is a graph showing a variation of a threshold value $W_S$ obtained from a function: $W_S$=F(WFL−WFR), which is used for determining the seat occupancy state according to a modified example of the second embodiment. The graph illustrated in FIG. 10 has a horizontal axis (one axis) on which the left-right load difference WFL−WFR calculated by the controller 3 is shown and a vertical axis (the other axis) on which the total load WFR+WFL is shown. The function: $W_S$=F (WFL−WFR) determines the threshold value $W_S$ for the total load WRR+WRL on the basis of the left-right load difference WFL−WFR calculated by the controller 3. The function: $W_S$=F (WFL−WFR) is stored in the memory portion 33.

According to the modified example of the second embodiment, the left-right load difference WFL−WFR calculated by the controller 3 is assigned to the function: $W_S$=F(WFL−WFR) to thereby obtain the threshold value $W_S$. After the threshold value $W_S$ is set, the threshold value $W_S$ is compared with the total load WFR+WFL; thereby, the seat occupancy state of the seat 1A is determined. As shown in FIG. 10, the function: $W_S$=F(WFL−WFR) is set so that the threshold value $W_S$ increases as the left-right load difference WFL−WFR increases.

Figure 11:
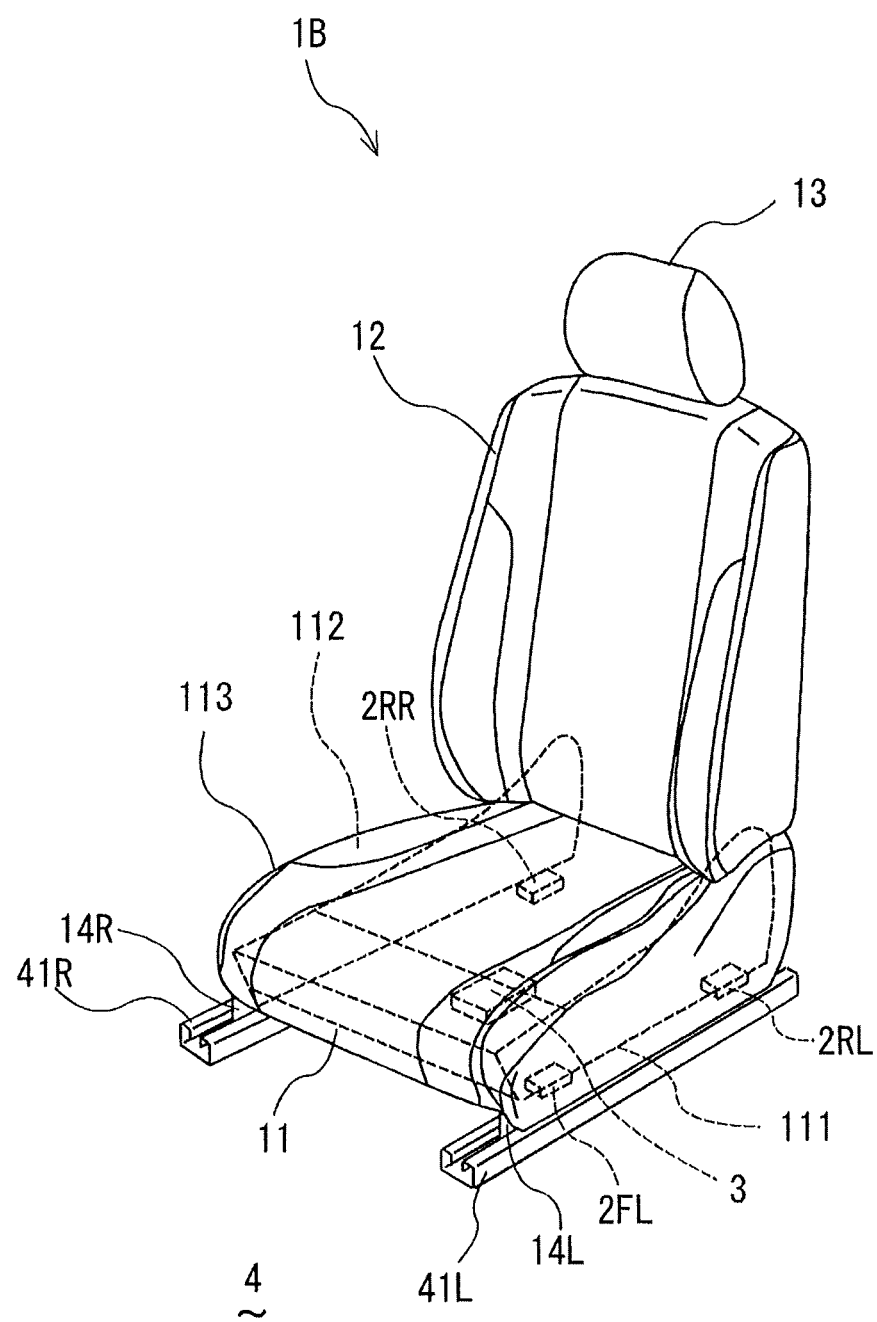
FIG. 11 is a perspective view illustrating the seat on which the apparatus for determining the seat occupancy state according to a third embodiment is mounted.

Next, a third embodiment of the apparatus for determining the seat occupancy state will be explained as follows with reference to FIG. 11 and FIG. 12. As shown in FIG. 11, in addition to the pair of seat sensors 2RR and 2RL arranged at the right and left sides, respectively, of the rear portion of the seat cushion 11 of a seat 1B for the vehicle, the front left seat sensor 2FL serving as a front load detecting portion is arranged at the left side of the front portion of the seat cushion 11. Hereinafter, the rear right seat sensor 2RR (right load detecting portion), the rear left seat sensor 2RL (left load detecting portion), and the front left seat sensor 2FL will be collectively referred to as the seat sensors 2RR, 2RL, and 2FL.

The seat sensors 2RR, 2RL, and 2FL are connected to the controller 3. The controller 3 calculates the total load WRR+WRL by adding the load WRR detected by the seat sensor 2RR to the load WRL detected by the seat sensor 2RL. The controller 3 further calculates the right-left load difference WRR−WRL by subtracting the load WRL detected by the seat sensor 2RL from the load WRR detected by the seat sensor 2RR.

Figure 12:
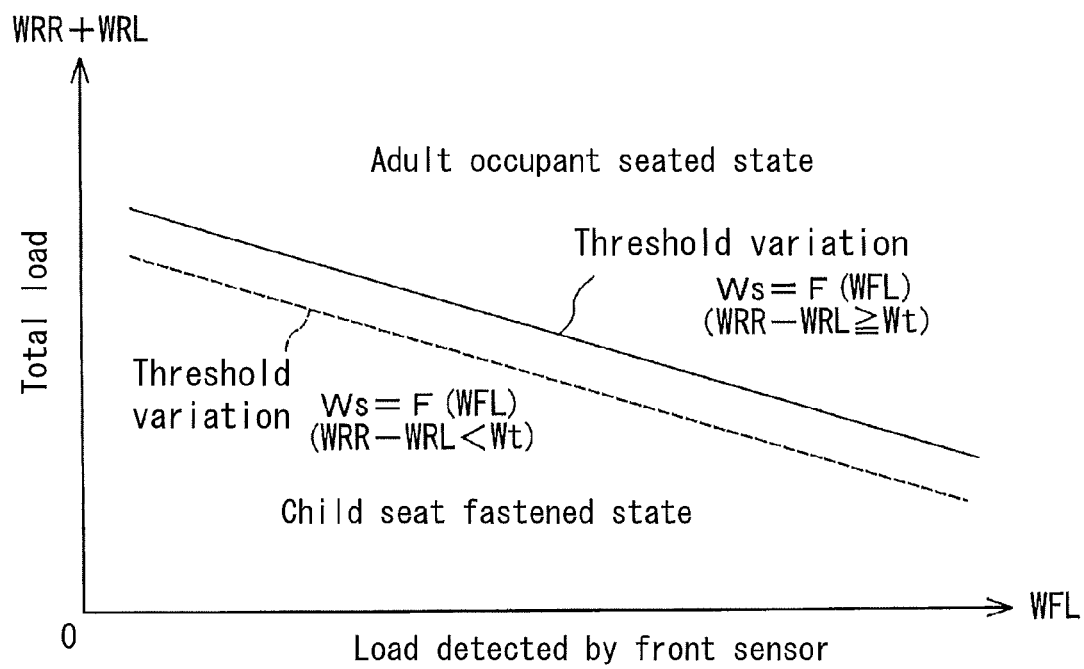
FIG. 12 is a graph showing a variation of a threshold value obtained from a function, which is used for determining the seat occupancy state according to the third embodiment.
Figure 13A:
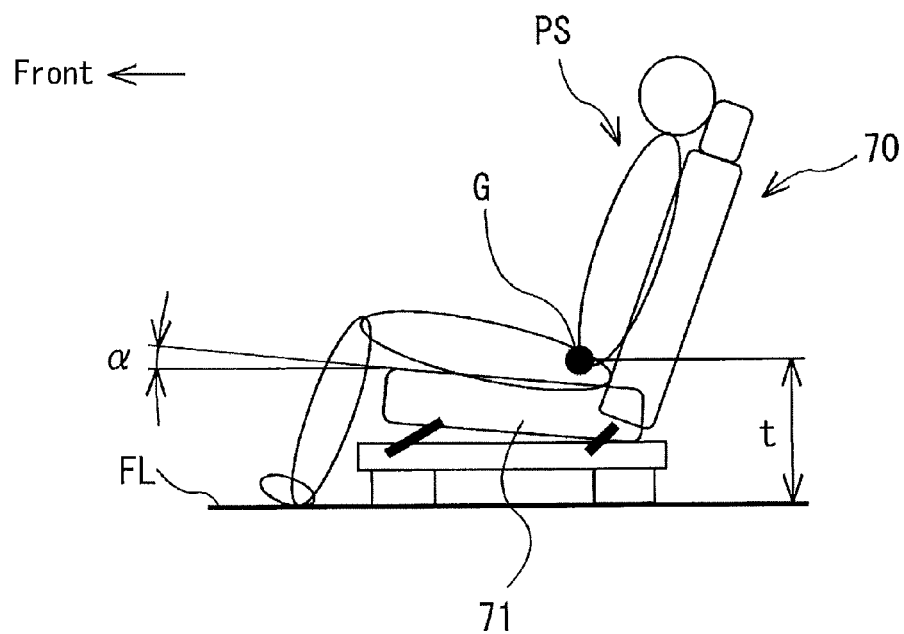
FIG. 13A is an explanatory drawing for a shift of a load of the seat, caused by an operation of a lift mechanism and is a simplified view showing a case where the seat cushion of the seat is at the lowest position in a vertical direction of the vehicle.
Figure 13B:
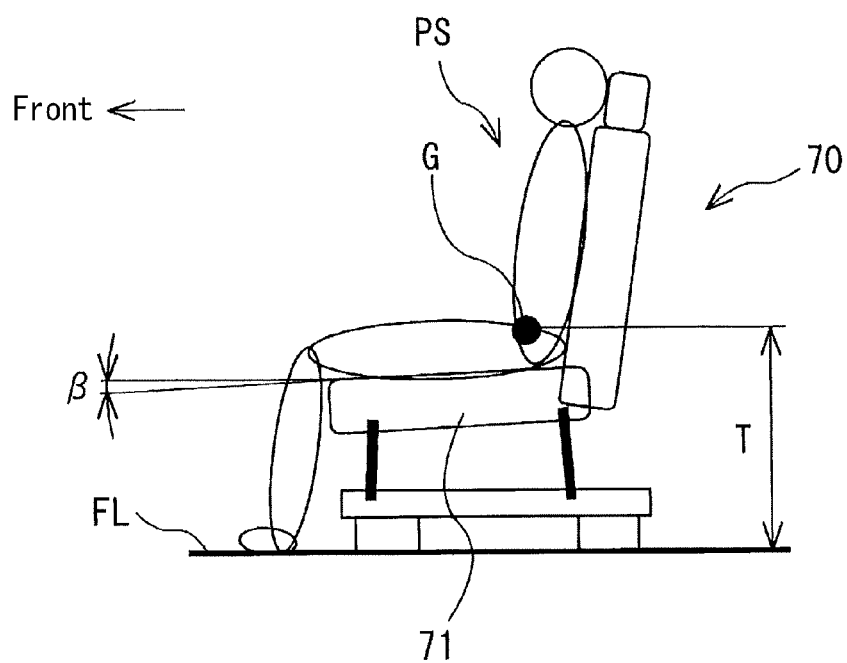
FIG. 13B is an explanatory drawing for the shift of the load of the seat, caused by the operation of the lift mechanism and is a simplified view showing a case where the seat cushion of the seat is at the highest position in the vertical direction of the vehicle.

FIG. 12 is a graph showing a variation of a threshold value obtained from a function: $W_S$=F (WFL), which is used for determining the seat occupancy state of the seat 1B according to the third embodiment. The graph illustrated in FIG. 12 has a horizontal axis (one axis) on which the load WFL (corresponding to a load applied to the front portion of the seat cushion 11) detected by the seat sensor 2FL. The function: $W_S$=F(WFL) determines the threshold value $W_S$ for the total load WRR+WRL on the basis of the load WFL detected by the seat sensor 2FL. The function: $W_S$=F(WF) is stored in the memory portion 33.

As illustrated in FIG. 12, the function: $W_S$=F(WFL) is formed by two function formulas depending on the size of the right-left load difference WRR−WRL calculated by the controller 3. When the right-left load difference WRR−WRL is less than a predetermined threshold value $W_t$ (indicated by a dashed line in FIG. 12), the threshold value $W_S$ for the total load WRR+WRL is set to be small compared to the threshold value $W_S$ when the right-left load difference WRR−WRL is equal to or greater than the predetermined threshold value $W_t$ (indicated by a full line). Any of the function formulas of the function: $W_S$=F(WFL) is linearly formed so that the threshold value $W_S$ decreases as the load WFL detected by the seat sensor 2FL increases. According to the third embodiment, the load WFL detected by the seat sensor 2FL is assigned to the function formula: $W_S$=F(WFL) to obtain the threshold value $W_S$. After the threshold $W_S$ is obtained, the total load WRR+WRL is compared with the threshold $W_S$ to determine the seat occupancy state of the seat 1B accordingly.

According to the third embodiment, the seat sensors 2RR and 2RL are arranged between the rear portion of the seat cushion 11 and the vehicle floor 4 and the seat sensor 2FL detecting the load applied to the front portion of the seat cushion 11 is provided between the front portion of the seat cushion 11 and the vehicle floor 4. Further, the threshold value $W_S$ is set to decrease as the load WFL acting on the front portion of the seat cushion 11 increases; thereby, the threshold value $W_S$ may be varied depending on the size of the load WFL as well as on the basis of the size of the right-left load difference WRR−WRL. As a result, even when a seating load applied to the seat 1B due to the variation of the height H of the seat cushion 11 shifts in the front-rear direction of the vehicle, the seat occupancy state of the seat 1B is further accurately determined.

For example, when the occupant leans against a vehicle door, a center console, or the like, an unbalanced load may be applied in the width direction of the seat cushion 11 of the seat 1B and the right-left load difference WRR−WRL relative to the height H of the seat cushion 11 may vary. Even in such case, the seat occupancy state of the seat 1B is accurately determined on the basis of the size of the load WFL applied to the front portion of the seat cushion 11.

Further, according to the third embodiment, the function: $W_S=F(WFL)$ is utilized to determine the threshold value $W_S$ for the total load WRR+WRL on the basis of the right-left load difference WRR−WRL; thereby, a relation between the load WFL and the threshold value $W_S$ for the total load WRR+WRL approximates the function: $W_S=F(WFL)$. As a result, the threshold value $W_S$ is easily determined in accordance with the load WFL applied to the front portion of the seat cushion 11.

The apparatus for determining the seat occupancy state of the seat 1, 1A, 1B is not limited to the aforementioned first, second, and third embodiments and an applicable range of the apparatus and the method may be modified and expanded as follows. The apparatus and the method according to the aforementioned embodiments are applicable not only to the seat 1, 1A, 1B for the occupant seated on a front passenger seat but also to a middle or rear seat. In addition, the apparatus for determining the seat occupancy state according to the embodiments are not limited to the case where the adult passenger seated state or the child seat fastened state is determined by the controller 3. Alternatively, the apparatus and the method may be applied to various cases of the determination of the seat occupancy state, such as when the adult passenger is seated or not seated on the seat 1, 1A, 1B and when the luggage is placed on the seat 1.

Further, pressure sensors for detecting pressure applied to the seat cushion 11 when the occupant is seated on the seat cushion 11 may be used instead of the seat sensors 2FR, 2FL, 2RR, and 2RL. In this case, the load applied to the seat cushion 11 is detected from the pressure detected by the pressure sensors. Alternatively, displacement sensors for detecting a displacement of the seat cushion 11 may be used instead of the seat sensors 2FR, 2FL, 2RR, and 2RL. In this case, the load applied to the seat cushion 11 is detected from the amount of a displacement of the seat cushion 11 against a biasing force of seat springs.

Furthermore, according to the first and second embodiments, the threshold values W1 to W4 indicated on the map MP1 shown in FIG. 6 and the threshold values W5 to W8 indicated on the map MP2 shown in FIG. 9 are formed in a stepwise manner. Alternatively, the threshold values W1 to W8 may be indicated by a continuous line. Moreover, the lift mechanism 15 is not limited to the configuration described in the first embodiment and may include any configurations and operating principles as long as being configured so that one of the frame members 111R and 111L of the seat frame 111 is supported by the other of the frame members 111R and 111L. In addition, a center of gravity of a seat for a vehicle is moved forward in a front-rear direction of the vehicle by the shift of a load of an occupant seated on the seat; therefore, the apparatus for determining the seat occupancy state according to the embodiments may be applied to the seat that includes the seat cushion 11 moving vertically.

Further alternatively, the seat 1, 1A, 1B may be configured so that the frame member 111L is supported by the frame member 111R driven by the lift mechanism 15. Furthermore, the source of power of the lift mechanism 15 to move the seat cushion 11 is not limited to the electric motor 155. Alternatively, the seat cushion 11 may be manually moved upward and downward by the occupant.

In the third embodiment, when the seat sensor (front right sensor) 2FR is arranged at the front portion of the seat cushion 11 instead of the seat sensor (front left sensor) 2FL, the threshold value $W_S$ for the total load WRR+WRL may be set to decrease as the load WFR detected by the seat sensor (front left sensor) 2FR increases. Moreover, in the third embodiment, a seat sensor may be arranged in the center of the front portion of the seat cushion 11 in the width direction instead of the seat sensor (front left sensor) 2FL.

In addition, when the seat sensors (front right sensor and front left sensor) 2FR and 2FL are arranged at the front portion of the seat cushion 11 and either one of the seat sensors (rear right sensor and rear left sensor) 2RR and 2RL is arranged at the rear portion of the seat cushion 11, the threshold value $W_S$ for the total load WFR+WFL may be set to increase as a load detected by either one of the seat sensors 2RR and 2RL decreases. Alternatively, the controller 3 calculates a mean value of loads detected by right and left seat sensors to compare the mean value with a predetermine threshold value; thereby, a seat occupancy state of a seat for a vehicle may be determined.

As described above, in the apparatus for determining the seat occupancy state according to the aforementioned embodiments, the threshold value is varied depending on the difference value of the loads applied to the right and left sides of the seat cushion 11; thereby, the seat occupancy state of the seat 1, 1A, 1B is accurately determined even when the seating load shifts in the front-rear direction in conjunction with the variation of the height H of the seat cushion 11. In the seat 1, 1A, 1B including the lift mechanism 15, in a case where one of the frame members 111R and 111L, which serves as the driven member to which the driving force is not applied directly from the lift mechanism 15, is supported via the lift mechanism 15 by the other of the frame members 111R and 111L, which serves as the driving member, the difference value of the loads applied to the right and left sides, respectively, of the front or rear portion of the seat cushion 11 varies depending on the height H of the seating cushion 11. Such point is taken into consideration in the aforementioned embodiments.

In particular, when the driving member of one of the frame members (right and left frames) 111R and 111L is supported by the driven member of the other of the frame members 111R and 111L, the difference between the loads applied to the right and left sides of the seat cushion 11 occurs. The difference results from the following phenomenon: the connecting rod 153 provided between the frame members 111R and 111L are distorted in order to support the driven member of the other of the right and left frame members 111R and 111L; therefore, the movement of the driving member of the other of the right and left frame members 111R and 111L is delayed relative to the movement of one of the frame members 111R and 111L. In addition, the load applied to the seat cushion 11 shifts forward in the front-rear direction as the seat cushion 11 is moved upward.

According to the aforementioned embodiments, when detecting the seating load that is equal to or a greater than the predetermined threshold value, the controller 3 determines that the adult occupant is seated on the seat 1, 1A, 1B. Further, when detecting the seating load that is less than the predetermined threshold value, the controller 3 determines that the child seat is fastened to the seat 1, 1A, 1B.

Accordingly, the adult occupant seated state where the air-bag is deployable may be properly distinguished from the child seat fastened state where the air-bag is not deployable.

According to the aforementioned embodiments, the controller 3 calculates the seating load by adding the load applied to the right side of the seat cushion 11 to the load applied to the left side of the seat cushion 11.

Accordingly, even when the difference occurs between the loads applied to the right and left sides of the seat cushion 11 of the seat 1, 1A, 1B, the variation of the seating load may be accurately determined.

According to the first embodiment, the seat sensors 2RR and 2RL are arranged between the rear portion of the seat cushion 11 and the vehicle floor 4. The controller 3 decreases the predetermined threshold value in accordance with the decrease of the difference value between the load applied to the right side of the seat cushion 11 and the load applied to the left side of the seat cushion 11.

Accordingly, the seat occupancy state of the seat 1 may be precisely determined regardless of the forward shift of the seating load due to the vertical movement of the seat cushion 11.

Moreover, the seat sensors 2RR and 2RL are arranged between the rear portion of the seat cushion 11 and the vehicle floor 4; therefore, the loads of the occupant and the child seat are easily applied to the seat sensors 2RR and 2RL. Consequently, even when seat sensors are not arranged at the front portion of the seat cushion 11, the load applied to the seat cushion 11 may be accurately detected. As a result, the seat occupancy state of the seat 1 is accurately determined and a cost reduction of the seat 1 in accordance with a reduction of the number of applicable seat sensors is realized.

According to the aforementioned first and second embodiments, the controller 3 is provided with the map MP1, MP2 including the horizontal axis on which one of the seating load and the difference value between the load applied to the right side of the seat cushion 11 and the load applied to the left side of the seat cushion 11 is shown and the vertical axis on which the other of the seating load and the difference value between the load applied to the right side of the seat cushion 11 and the load applied to the left side of the seat cushion 11 is shown. The controller 3 determines the seat occupancy state of the seat 1, 1A by use of the map MP1, MP2.

Accordingly, the seat occupancy state of the seat 1, 1A may be determined shortly by use of only a few calculations.

According to the embodiments, the controller 3 sets the predetermined threshold value by using the function determining the predetermined threshold value on the basis of the difference value between the load applied to the right side of the seat cushion 11 and the load applied to the left side of the seat cushion 11.

Accordingly, the relation between the difference of the loads applied to the right and left sides of the seat cushion 11 and the threshold value for the seating load may approximate the predetermined function.

According to the aforementioned third embodiment, the seat sensors 2RR and 2RF are arranged between the rear portion of the seat cushion 11 and the vehicle floor 4 and the seat sensor 2FL detecting the load applied to the front portion of the seat cushion 11 is arranged between the front portion of the seat cushion 11 and the vehicle floor 4. The controller 3 decreases the predetermined threshold value in accordance with the increase of the load applied to the front portion of the seat cushion 11.

Accordingly, the threshold value for the seating load may be varied depending on the size of the load applied to the front portion of the seat cushion 11 as well as on the basis of the difference of the loads applied to the right and left sides of the seat cushion 11. Consequently, even when the seating load shifts in the front-rear direction due to the variation of the height H of the seat cushion 11, the seat occupancy state of the seat 1B may be further precisely determined.

According to the aforementioned third embodiment, the controller 3 sets the predetermined threshold value by using the function determining the predetermined threshold value on the basis of the load applied to the front portion of the seat cushion 11.

Accordingly, the relation between the load applied to the front portion of the seat cushion 11 and the threshold value for the seating load may approximate the predetermined function and the threshold value may be easily determined depending on the load applied to the front portion of the seat cushion 11.

In addition, in the method for determining the seat occupancy state according to the aforementioned embodiments, the threshold value is varied depending on the difference value between the loads applied to the right and left sides of the seat cushion 11; thereby, the seat occupancy state of the seat 1, 1A, 1B may be accurately determined even when the seating load shifts in the front-rear direction due to the variation of the height H of the seat cushion 11.

The principles, preferred embodiment and mode of operation of the present invention have been described in the foregoing specification. However, the invention which is intended to be protected is not to be construed as limited to the particular embodiments disclosed. Further, the embodiments described herein are to be regarded as illustrative rather than restrictive. Variations and changes may be made by others, and equivalents employed, without departing from the spirit of the present invention. Accordingly, it is expressly intended that all such variations, changes and equivalents which fall within the spirit and scope of the present invention as defined in the claims, be embraced thereby.

The invention claimed is:

1. An apparatus for determining seat occupancy, comprising:
a seat for a vehicle, including a seating portion on which an occupant is seated, and a seat back arranged at a rear portion of the seating portion;
right and left load detecting portions arranged between a vehicle floor and either one of a front portion and the rear portion of the seating portion, the right load detecting portion detecting a load applied to a right side of the seating portion, the left load detecting portion detecting a load applied to a left side of the seating portion; and
a seat occupancy determining portion calculating a seating load of the seat on the basis of the loads detected by the right and left load detecting portions and determining the seat occupancy of the seat by comparing the seating load with a predetermined threshold value, the seat including right and left upper rails and right and left frames, the right and left upper rails being arranged on the vehicle floor and keeping a predetermined distance between each other, the right and left upper rails extending along a front-rear direction of the seat, the right and left frames being positioned at upper sides of the right and left upper rails, respectively, and connected thereto via a lift mechanism, the right and left frames configuring a portion of the seating portion, wherein one of the right and left frames receives a driving force via the lift mechanism to move the seating portion vertically relative to the vehicle floor, and the other of the right and left frames is supported by one of the right and left frames via the lift mechanism, and wherein the seat occupancy determining portion varies the predetermined threshold value depending on a difference value between the load applied to the right side of the seating portion and the load applied to the left side of the seating portion.

2. The apparatus for determining the seat occupancy according to claim 1, wherein when detecting the seating load that is equal to or a greater than the predetermined threshold value, the seat occupancy determining portion determines that an adult occupant is seated on the seat, and when detecting the seating load that is less than the predetermined threshold value, the seat occupancy determining portion determines that a child seat is fastened to the seat.

3. The apparatus for determining the seat occupancy according to claim 1, wherein the seat occupancy determining portion calculates the seating load by adding the load applied to the right side of the seating portion to the load applied to the left side of the seating portion.

4. The apparatus for determining the seat occupancy according to claim 2, wherein the seat occupancy determining portion calculates the seating load by adding the load applied to the right side of the seating portion to the load applied to the left side of the seating portion.

5. The apparatus for determining the seat occupancy according to claim 1, wherein the right and left load detecting portions are arranged between the rear portion of the seating portion and the vehicle floor, and the seat occupancy determining portion decreases the predetermined threshold value in accordance with a decrease of the difference value between the load applied to the right side of the seating portion and the load applied to the left side of the seating portion.

6. The apparatus for determining the seat occupancy according to claim 2, wherein the right and left load detecting portions are arranged between the rear portion of the seating portion and the vehicle floor, and the seat occupancy determining portion decreases the predetermined threshold value in accordance with a decrease of the difference value between the load applied to the right side of the seating portion and the load applied to the left side of the seating portion.

7. The apparatus for determining the seat occupancy according to claim 3, wherein the right and left load detecting portions are arranged between the rear portion of the seating portion and the vehicle floor, and the seat occupancy determining portion decreases the predetermined threshold value in accordance with a decrease of the difference value between the load applied to the right side of the seating portion and the load applied to the left side of the seating portion.

8. The apparatus for determining the seat occupancy according to claim 1, wherein the seat occupancy determining portion is provided with a map including one axis on which one of the seating load and the difference value between the load applied to the right side of the seating portion and the load applied to the left side of the seating portion is shown and the other axis on which the other of the seating load and the difference value between the load applied to the right side of the seating portion and the load applied to the left side of the seating portion is shown, and the seat occupancy determining portion determines the seat occupancy of the seat by use of the map.

9. The apparatus for determining the seat occupancy according to claim 2, wherein the seat occupancy determining portion is provided with a map including one axis on which one of the seating load and the difference value between the load applied to the right side of the seating portion and the load applied to the left side of the seating portion is shown and the other axis on which the other of the seating load and the difference value between the load applied to the right side of the seating portion and the load applied to the left side of the seating portion is shown, and the seat occupancy determining portion determines the seat occupancy of the seat by use of the map.

10. The apparatus for determining the seat occupancy according to claim 3, wherein the seat occupancy determining portion is provided with a map including one axis on which one of the seating load and the difference value between the load applied to the right side of the seating portion and the load applied to the left side of the seating portion is shown and the other axis on which the other of the seating load and the difference value between the load applied to the right side of the seating portion and the load applied to the left side of the seating portion is shown, and the seat occupancy determining portion determines the seat occupancy of the seat by use of the map.

11. The apparatus for determining the seat occupancy according to claim 5, wherein the seat occupancy determining portion is provided with a map including one axis on which one of the seating load and the difference value between the load applied to the right side of the seating portion and the load applied to the left side of the seating portion is shown and the other axis on which the other of the seating load and the difference value between the load applied to the right side of the seating portion and the load applied to the left side of the seating portion is shown, and the seat occupancy determining portion determines the seat occupancy of the seat by use of the map.

12. The apparatus for determining the seat occupancy according to claim 1, wherein the seat occupancy determining portion sets the predetermined threshold value by using a function determining the predetermined threshold value on the basis of the difference value between the load applied to the right side of the seating portion and the load applied to the left side of the seating portion.

13. The apparatus for determining the seat occupancy according to claim 2, wherein the seat occupancy determining portion sets the predetermined threshold value by using a function determining the predetermined threshold value on the basis of the difference value between the load applied to the right side of the seating portion and the load applied to the left side of the seating portion.

14. The apparatus for determining the seat occupancy according to claim 3, wherein the seat occupancy determining portion sets the predetermined threshold value by using a function determining the predetermined threshold value on the basis of the difference value between the load applied to the right side of the seating portion and the load applied to the left side of the seating portion.

15. The apparatus for determining the seat occupancy according to claim 5, wherein the seat occupancy determining portion sets the predetermined threshold value by using a function determining the predetermined threshold value on the basis of the difference value between the load applied to the right side of the seating portion and the load applied to the left side of the seating portion.

16. The apparatus for determining the seat occupancy according to claim 1, wherein the right and left load detecting portions are arranged between the rear portion of the seating portion and the vehicle floor and a front load detecting portion detecting a load applied to a front portion of the seating portion is arranged between the front portion of the seating portion and the vehicle floor, and the seat occupancy determining portion decreases the predetermined threshold value in accordance with an increase of the load applied to the front portion of the seating portion.

17. The apparatus for determining the seat occupancy according to claim 2, wherein the right and left load detecting portions are arranged between the rear portion of the seating portion and the vehicle floor and a front load detecting portion detecting a load applied to a front portion of the seating portion is arranged between the front portion of the seating portion and the vehicle floor, and the seat occupancy determining portion decreases the predetermined threshold value in accordance with an increase of the load applied to the front portion of the seating portion.

18. The apparatus for determining the seat occupancy according to claim 3, wherein the right and left load detecting portions are arranged between the rear portion of the seating portion and the vehicle floor and a front load detecting portion detecting a load applied to a front portion of the seating portion is arranged between the front portion of the seating portion and the vehicle floor, and the seat occupancy determining portion decreases the predetermined threshold value in accordance with an increase of the load applied to the front portion of the seating portion.

19. The apparatus for determining the seat occupancy according to claim 16, wherein the seat occupancy determining portion sets the predetermined threshold value by using a function determining the predetermined threshold value on the basis of the load applied to the front portion of the seating portion.

20. A method for determining seat occupancy, comprising:
providing a seat for a vehicle, including a seating portion, a seat back arranged at a rear portion of the seating portion, right and left upper rails, and right and left frames, the right and left upper rails arranged on a vehicle floor and keeping a predetermined distance between each other, the right and left upper rails extending along a front-rear direction of the seat, the right and left frames positioned at upper sides of the right and left upper rails, respectively, and connected thereto via a lift mechanism, the right and left frames configuring a portion of the seating portion, one of the right and left frames receiving a driving force via the lift mechanism to move the seating portion vertically relative to the vehicle floor, the other of the right and left frames being supported by one of the right and left frames via the lift mechanism;
detecting, by right and left load detecting portions arranged between the vehicle floor and either one of a front portion and the rear portion of the seating portion, loads applied to right and left sides, respectively, of either one of the front portion and the rear portion of the seating portion, the right load detecting portion detecting a load applied to a right side of the seating portion, the left load detecting portion detecting a load applied to a left side of the seating portion;
calculating, by a processor, a seating load on the basis of the detected loads; and
determining the seat occupancy of the seat by comparing the calculated seating load with a predetermined threshold value varying depending on a difference value between the load applied to the right side of the seating portion and the load applied to the left side of the seating portion.

* * * * *